United States Patent [19]
Bonnet

[11] Patent Number: 5,896,999
[45] Date of Patent: Apr. 27, 1999

[54] SORTING SYSTEM

[75] Inventor: Henri Bonnet, Atlanta, Ga.

[73] Assignee: United Parcel Service of America, Inc., Atlanta, Ga.

[21] Appl. No.: 08/732,017

[22] Filed: Oct. 16, 1996

[51] Int. Cl.$^6$ .................................................. B07C 5/00
[52] U.S. Cl. .................. 209/559; 209/583; 209/584; 209/644; 209/656; 209/923
[58] Field of Search .................. 209/559, 583, 209/584, 587, 630, 644, 656, 702, 705, 942, 923; 198/370.01, 370.11

[56] References Cited

U.S. PATENT DOCUMENTS

| | | | |
|---|---|---|---|
| 3,231,066 | 1/1966 | Harrison et al. | |
| 3,680,681 | 8/1972 | Burk | 198/370.01 X |
| 4,214,663 | 7/1980 | Schopp et al. | 198/370.11 X |
| 4,239,434 | 12/1980 | Gannon | 209/942 X |
| 4,461,378 | 7/1984 | Roth. | |
| 5,135,101 | 8/1992 | Dudley | 198/370.11 X |
| 5,388,681 | 2/1995 | Bonnet. | |
| 5,444,962 | 8/1995 | Bonnet. | |
| 5,489,017 | 2/1996 | Bonnet. | |
| 5,620,102 | 4/1997 | Finch, Jr. | 209/705 X |
| 5,703,783 | 12/1997 | Allen et al. | 209/584 X |
| 5,737,438 | 4/1998 | Zlotnick et al. | 209/584 X |

FOREIGN PATENT DOCUMENTS 1131901  10/1968  United Kingdom.

*Primary Examiner*—David H. Bollinger
*Attorney, Agent, or Firm*—Schnader Harrison Segal & Lewis LLP; James A. Drobile; Michael B. Fein

[57] ABSTRACT

The Invention relates to an apparatus and a method for sorting objects into destination containers arranged along one or both sides of a continuous conveyer belt apparatus wherein appropriate portions of the belt can be raised and lowered at times and locations to cause objects to fall into appropriate destination containers. Air may optionally be directed toward said objects in coordination with the elevation of the belt to assist in causing the objects to fall into the appropriate destination container.

15 Claims, 5 Drawing Sheets

SORTING SYSTEM

BACKGROUND OF THE INVENTION

1. Field of the Invention

This invention pertains to apparatus and methods of sorting objects such as small parcels into destination containers such as bags using a continuous conveyer belt.

2. Description of the Prior Art

Conveyer apparatus for selectively depositing articles at various points along the conveyer are known. Such apparatus are useful for sorting packages or other objects in accordance with size, post office zip code, or other destination codes such as may be used by parcel delivery services. Bins are generally provided at several points along the side of the conveyer apparatus, and articles are placed on the surface and are sorted using code reading devices, electric eyes, and the like.

Tilting conveyer apparatus has been suggested by, for example, Harrison et al., U.S. Pat. No. 3,231,066.

There are also known side discharge assemblies which include a belt assembly for supporting a flexible belt, and a member provided for local lateral tilting of the belt assembly. Such a conveyer assembly is disclosed, for example, in U.S. Pat. No. 4,461,378, to Roth. Such a system, like the systems employing carriages on a closed loop, requires a substantial initial investment. In addition, such a system has a large number of moving parts, which are prone to breakdowns as a result of mechanical wear.

More recently the present inventor has disclosed tilt tray package sorting apparatus in U.S. Pat. No. 5,489,017, and an inflatable conveyer belt in U.S. Pat. No. 5,388,681.

Each of the prior inventions uses special conveyer means which includes either inflatable chambers, tray assemblies, or discontinuous conveyer sections.

None of the prior devices use flexible, continuous conveyer belts of the type which are easy to maintain and replace and can be used in a longitudinal apparatus.

It is an object of the present invention to provide apparatus which overcomes the problems and disadvantages of the prior devices.

Another object is to provide a sorting apparatus which is more efficient and effective than prior devices using a continuous flexible conveyer belt.

A still further object is to provide an improved method of sorting which allows for more effective unloading of objects from a conveyer belt.

SUMMARY OF THE INVENTION

These objects, and others which will become apparent from the following disclosure, are achieved by the present invention which comprises a flexible, continuous conveyer belt adapted to carry objects along a longitudinal direction, having an upper surface, an underside, a left side, a right side, and a center; a plurality of means for receiving objects sorted off a side of said belt; a plurality of means for elevating either said center, said left side, or said right side of said belt, means for determining which object is to be sorted to which means for receiving objects; and programmable logic control means capable of receiving information from said means for determining which object is to be sorted into which means for receiving objects and controlling each of said plurality of means for elevating either said center, left, or right side of said belt so that each of said objects falls off of said belt into the appropriate means for receiving objects sorted off a side of said belt.

In another aspect the invention comprises a method of sorting objects into destination means comprising moving a flexible conveyer belt in a longitudinal direction along a conveyer apparatus; providing a plurality of destination means along one or both sides of said conveyer apparatus; placing objects on said belt; determining which object is to be placed in which destination means for receiving objects; and elevating the center, left, or right side of said flexible conveyer belt at appropriate times and locations so as to tilt each object so that it falls off toward the left or right side of said belt into the appropriate destination means.

DETAILED DESCRIPTION OF THE INVENTION AND THE PREFERRED EMBODIMENTS

Figure 1:
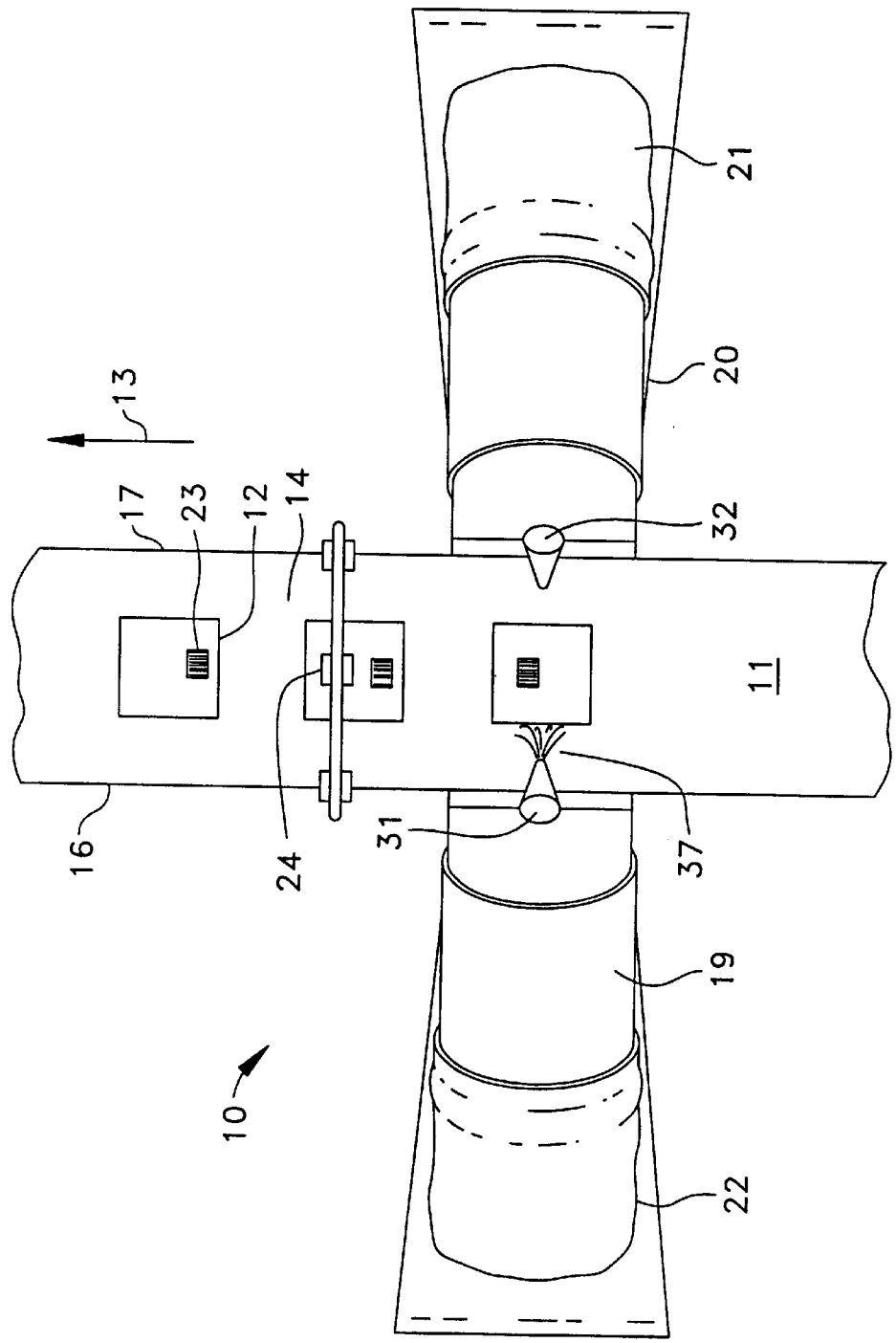
FIG. 1 is a plan view of a section of an embodiment of the sorting apparatus of the invention.
Figure 2:
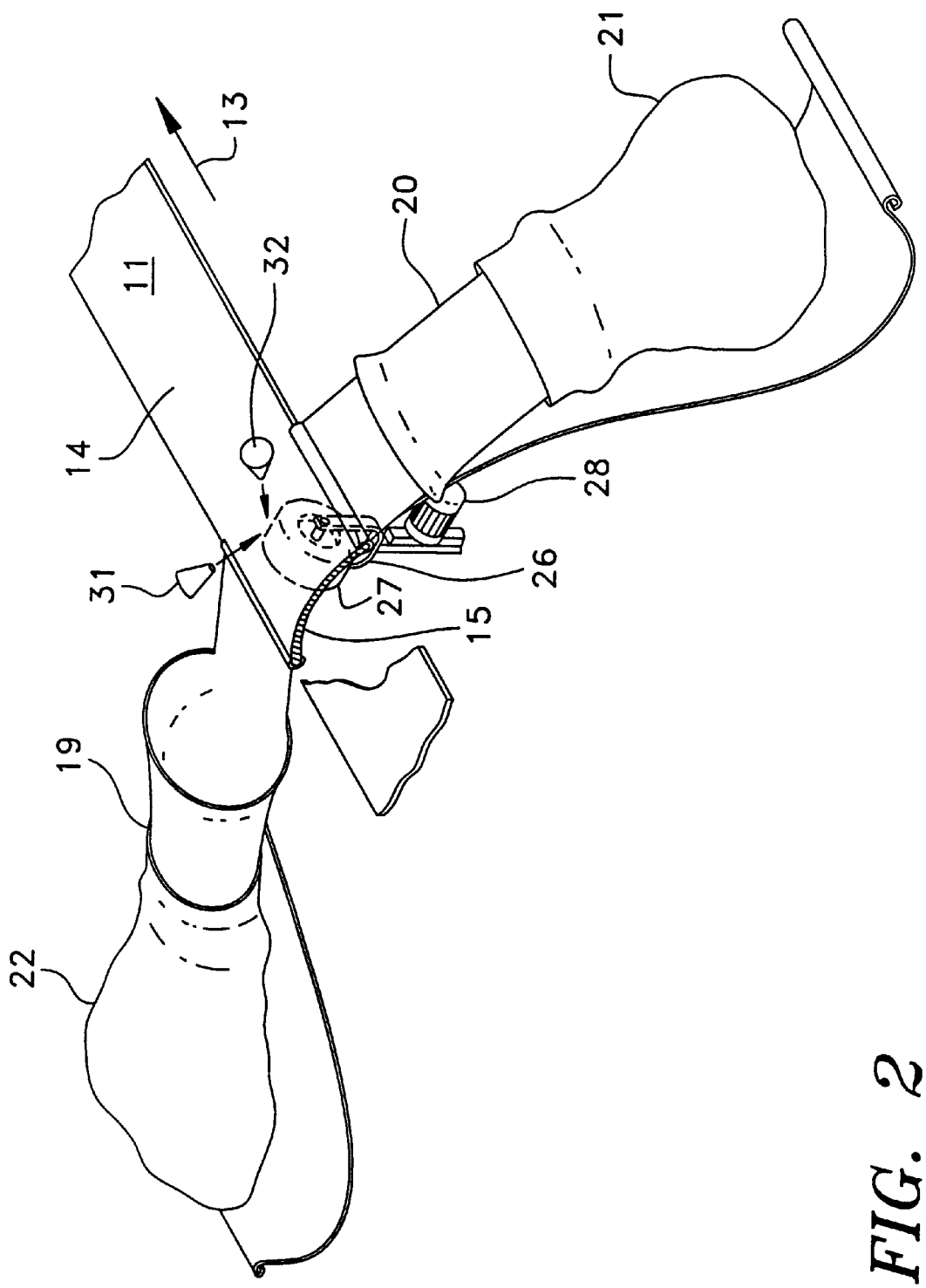
FIG. 2 is a perspective view of a section of an embodiment of the sorting apparatus of the invention.
Figure 4:
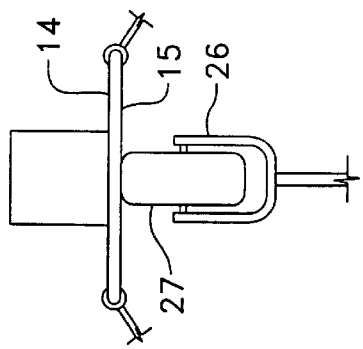
FIG. 4 is a side cross-sectional view of an elevating means in normal position.
Figure 3:
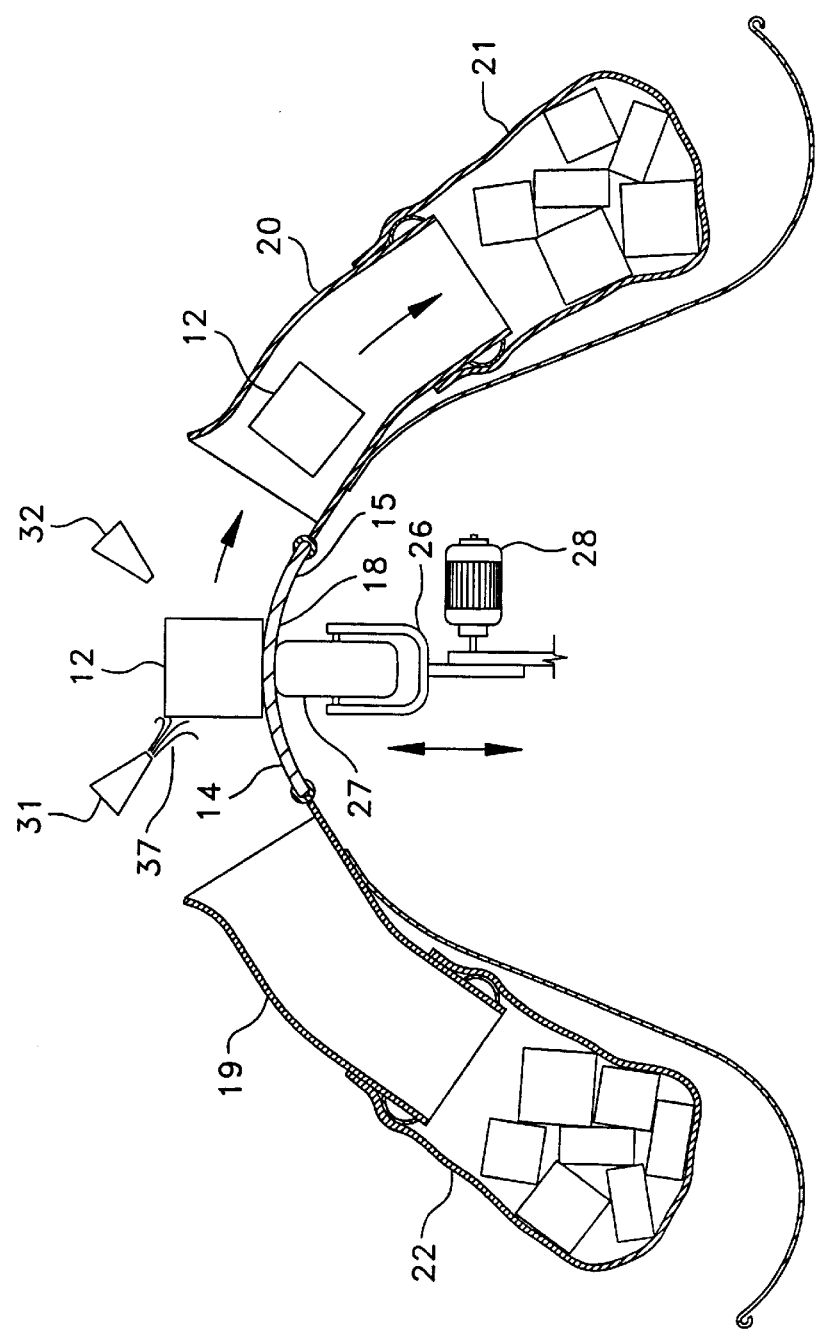
FIG. 3 is a side cross-sectional view showing objects being sorted.
Figure 5:
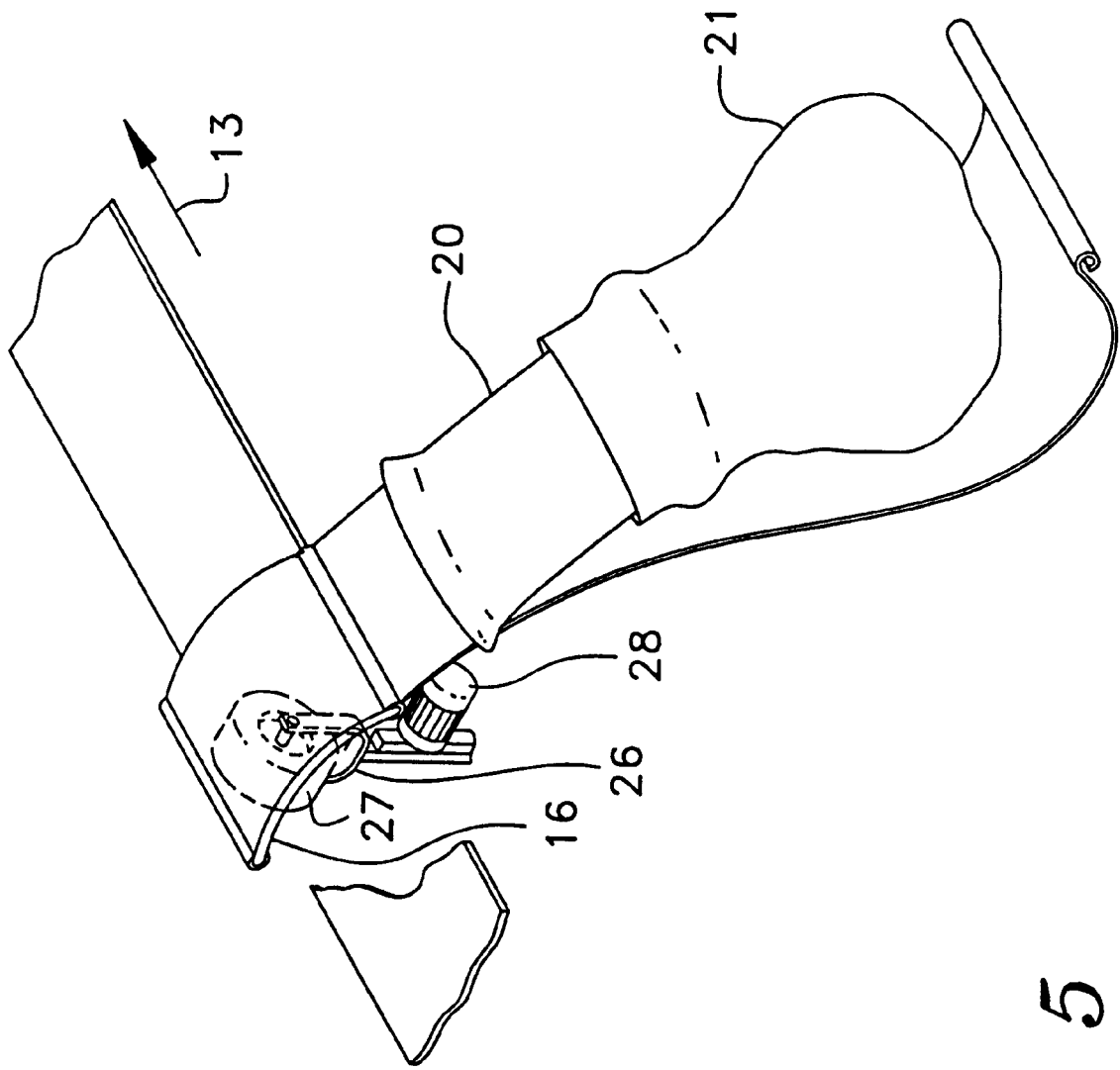
FIG. 5 is a perspective view of a section of a second embodiment of the invention.

Referring to FIG. 1, there is shown an apparatus for sorting objects 10 comprising a flexible, continuous conveyer belt 11 adapted to carry objects 12 along a longitudinal direction 13, having an upper surface 14, an underside 15 (FIG. 2), a left side 16, a right side 17, and a center 18 (FIG. 3). The belt is preferably a conventional belt of the type which is well known and widely used in sorting systems, rather than the special inflatable type of my earlier U.S. Pat. No. 5,388,681. A plurality of means for receiving objects such as sorting chutes 19 and 20 can be arranged either all along one side of the conveyer belt (not illustrated) or along both sides of the conveyer belt. In a preferred embodiment there are as many sorting chutes 19 and 20, each of which having removable and replaceable destination bags 22 and 21, as there are destinations to be sorted, e.g., by zip code. The objects 12, e.g., small packages, are preferably coded with either bar code stickers 23 or magnetic strips (not illustrated), either of which can be read by a reader, either a bar code reader 24 or a reader of magnetic strip information (not illustrated), for example.

The bar code information 23 can be read by readers 24 at a plurality of locations along the conveyer apparatus and, by use of the programmable logic control, the package can be sorted off a side of the belt 11 or 12 into the proper destination bag corresponding to the coded information on the object or package.

In another embodiment, the apparatus includes a photocell (not illustrated) immediately after the location where an operator puts an object on the belt to signal to the programmable logic controller the exact location of an object in relation to the belt when it reaches the photocell, a shaft pulse encoder to indicate the exact distance the belt has moved from the photocell location at a particular time, and with destination sorting chute 19 and 20 location information previously inputted into the programmable logic controller. In operation using this embodiment the operator manually inputs into the programmable logic controller the destination for each object as the operator places it on the belt. In this embodiment, no bar code or magnetic coding and corresponding readers are necessary since the apparatus has the destination information and location for each object, and is programmed to operate the sorting mechanism when the object reaches the correct means for receiving objects 19, 20, etc. In this embodiment the programmable logic controller causes the objects to be sorted to the left or right when the object has reached the correct location along the conveyer apparatus in embodiments where receiving means are located on both sides.

The sorting conveyer 10 apparatus of the invention comprises a plurality of elevating elements 26 for elevating the belt from the underside 15 at the corresponding plurality of destination locations 19, 20, etc. At the destination locations, the object 12 to be sorted is caused by the sorting conveyer apparatus 10 to fall to a side of the belt 16 or 17 into elements for receiving objects such as destination chutes 19 and 20 with bags 22 and 21 on the bottom by operation of the elevating apparatus 26, optionally in cooperation with air blowing elements 31 and 32 such as electronically controlled air blowers having jet nozzles. The elevating elements can be arranged to elevate either said center 18, said left side 16, or said right side 17 of said belt 11. In some embodiments only the center is elevated and blowing elements are provided for urging the object to the left or the right. In other embodiments the elevating elements can be arranged on either the left, the right, or both, corresponding to where the receiving elements are located. In certain embodiments a single elevating means at a particular location along the belt at which there are both left and right side receiving elements can be used to raise either the left or right side of the belt to tilt the belt and the object in either left or right direction and thereby sort the object into either the right or left side receiving elements.

Figure 6:
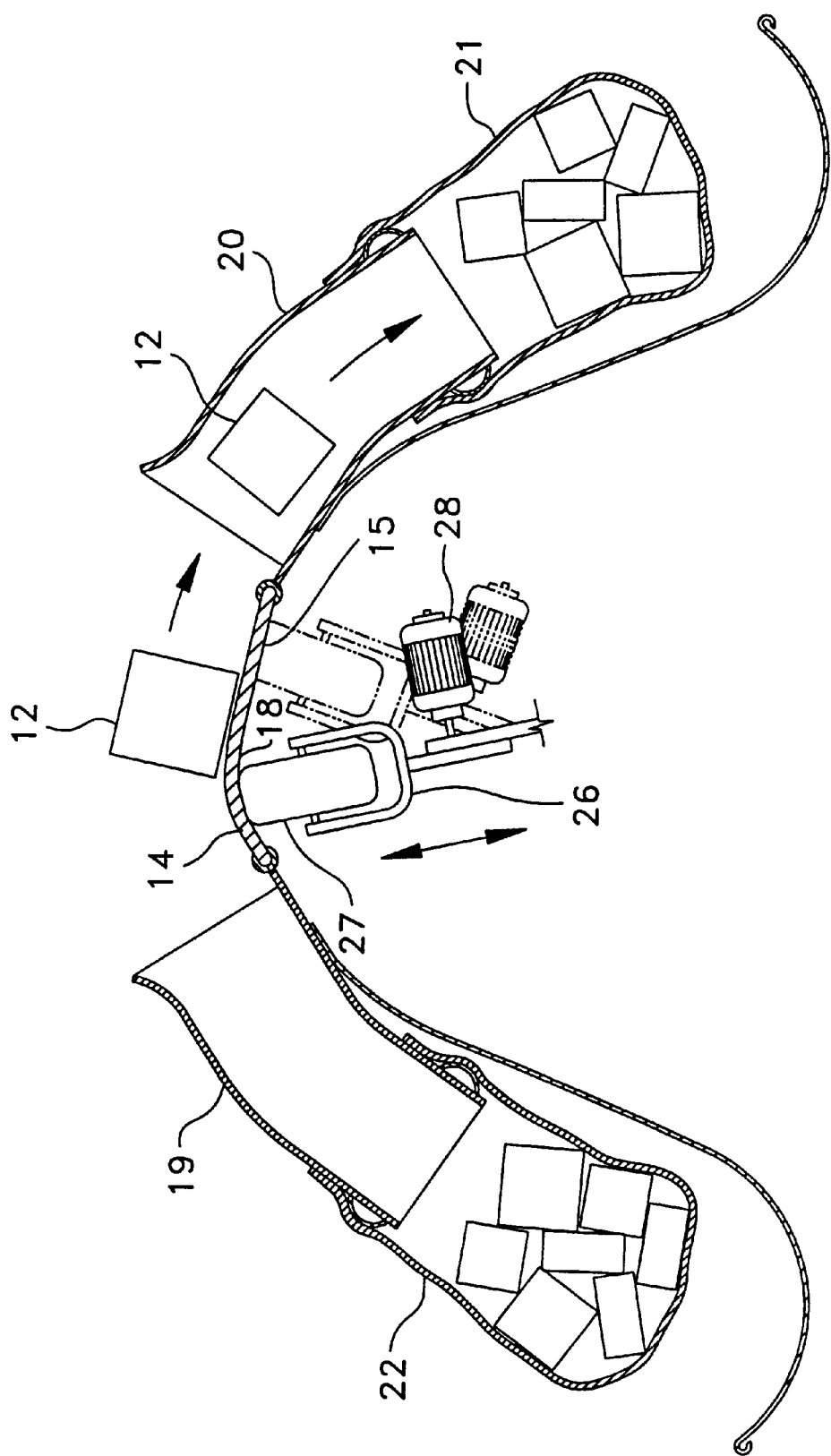
FIG. 6 is a side cross-sectional view of the second embodiment.

Elevating element 26 is illustrated as including a freewheel 27 located below said belt, and servo motor elements 28 for elevating said freewheel 27 against said underside 15 of said belt so as to in turn elevate said center, left, or right side and for lowering said freewheel, upon signal from said programmable logic control means. Embodiments wherein a single the freewheel is selectively elevated against the right or left underside of the belt, shown in FIG. 6, are suitable.

Elements for receiving objects are illustrated as chutes 19 and 20 adapted to releasably engage flexible sort bags 21 and 22, respectively.

Air blowing elements 31 and 32 above said upper surface are adapted to blow air 37 toward a corresponding receiving element 20 and 19, respectively, said air blowing element being controlled by said programmable logic control means so as to selectively blow air in the direction of the appropriate receiving element when the belt is elevated by one of the elevating elements at an appropriate time so as to sort each of said objects into the appropriate receiving element.

The air blowing elements are illustrated as electronically controlled air blowers having jet nozzles.

Preferred receiving elements are illustrated in Bonnet, U.S. Pat. No. 5,444,962, and include an inflatable air bladder and elements to inflate and deflate said bladder upon signal from said programmable logic control means, said bladder functioning to release a sort bag when a preselected object count for a particular sort bag has been reached, to hold sorted objects in a chute during the time when a sort bag has been released but prior to replacement with a new sort bag, and to permit engagement of a new sort bag on said bladder.

Preferably each of the elevating elements are each located below the center of the belt at positions corresponding to said receiving elements and are adapted to destabilize objects, and said air blowing elements are controlled by the programmable logic controller so as to cause each object to fall into the appropriate chute.

Also preferred are encoding elements (not shown) for determining which object is to be sorted into which receiving elements, and reading elements determining the identity of objects at selected locations on said belt.

Preferred encoding elements include voice recognition means, bar coding markings, or key entry means and preferred reading elements include photocells, bar code readers 24 or elements for encoding directly on the belt.

In practice, the method of sorting objects into destination containers comprises moving a flexible conveyer belt in a longitudinal direction along a conveyer apparatus; providing a plurality of destination elements along one or both sides of the conveyer apparatus; placing objects on the belt; determining which object is to be placed in which destination element and elevating the center, left, or right side of the flexible conveyer belt at appropriate time and location so as to tilt each object sufficiently that it falls off toward the left or right side of the belt into the appropriate destination element.

Each object is preferably encoded with destination information and elements are provided to read the destination information and to control when and where the elevating takes place in order to sort the objects into the appropriate destination elements.

It will be appreciated that there are considerable variations that can be accomplished in the system, article, and method of the invention without departing from the spirit and scope thereof. The invention is not limited to the preferred embodiment illustrated herein. There exist other embodiments and alternatives which are fully encompassed within the scope of the invention.

What is claimed is:

1. An apparatus for sorting objects comprising:

a. a flexible, continuous conveyer belt adapted to carry objects along a longitudinal direction, having an upper surface, an underside, a left side, a right side, and a center;

b. a plurality of means for receiving objects sorted off a side of said belt;

c. a plurality of means for elevating either said center, said left side, or said right side of said belt;

d. means for determining which object is to be sorted to which means for receiving objects;

e. programmable logic control means capable of receiving information from said means for determining which object is to be sorted into which means for receiving objects and controlling each of said plurality of means for elevating either said center, left, or right side of said belt so that each of said objects falls off of said belt into the appropriate means for receiving objects sorted off a side of said belt.

2. Apparatus according to claim 1 wherein said means for elevating said center, left, or right side of said belt includes a freewheel located below said belt, and means for elevating said freewheel against said underside of said belt so as to in turn elevate said center, left, or right side and for lowering said freewheel, upon signal from said programmable logic control means.

3. Apparatus according to claim 1 wherein said means for receiving objects are chutes adapted to releasably engage flexible sort bags.

4. Apparatus according to claim 1 further including a plurality of means above said upper surface for blowing air toward a corresponding means for receiving objects sorted off a side of said belt, said means being controlled by said programmable logic control means so as to selectively blow air in the direction of the appropriate means for receiving objects sorted of a side of said belt when said center, left, or right side of said belt is elevated by one of said means for elevating at an appropriate time so as to sort each of said objects into the appropriate receiving means.

5. Apparatus according to claim 4 wherein said means for blowing air toward said right side and toward said left side are electronically controlled air blowers having jet nozzles.

6. Apparatus according to claim 4 wherein each of said means for elevating are each located below said center at positions corresponding to said means for receiving objects and are adapted to destabilize objects, and said means for blowing are controlled by said programmable logic control means so as to cause each object to fall into the appropriate chute.

7. Apparatus according to claim 1 wherein said means for receiving objects includes an inflatable air bladder and means to inflate and deflate said bladder upon signal from said programmable logic control means, said bladder functioning to release a sort bag when a preselected object count for a particular sort bag has been reached, to hold sorted objects in a chute during the time when a sort bag has been released but prior to replacement with a new sort bag, and to permit engagement of a new sort bag on said bladder.

8. Apparatus according to claim 1 further wherein said means for determining which object is to be sorted into which means for receiving objects comprises encoding means for identifying objects and reading means for determining identity of objects at locations on said belt.

9. Apparatus according to claim 8 wherein said encoding means includes voice recognition means or key entry means.

10. Apparatus according to claim 8 wherein said reading means includes photocells, bar code readers or means for encoding on said belt.

11. Method of sorting objects into destination means comprising:

a. moving a flexible conveyer belt in a longitudinal direction along a conveyer apparatus;

b. providing a plurality of destination means along one or both sides of said conveyer apparatus;

C. placing objects on said belt;

d. determining which object is to be placed in which destination means for receiving objects;

e. elevating the center, left, or right side of said flexible conveyer belt at appropriate time and location so as to tilt said object sufficiently that it falls off toward the left or right side of said belt into the appropriate destination means.

12. Method according to claim 11 wherein each object is encoded with destination information and means are provided to read said destination information and to control when and where said elevating takes place in order to sort said objects into the appropriate destination means.

13. Method according to claim 11 wherein said destination means comprises a plurality of inflatable chutes on the left and right sides of the longitudinal direction of said belt, further comprising:

a. engaging sort bags on said chutes so that when one of said chutes is deflated, a sort bag is released from engagement with the deflated chute;

b. counting the number or weight of objects sorted into each sort bag;

c. controlling the inflation or deflation of each chute based on the number or weight of objects in each sort bag; and d. releasing a sort bag when a programmed number or weight of objects is received in said sort bag.

14. Method according to claim 11 wherein air is blown from said left or right sides onto an object where and when said belt is elevated to move said object into the appropriate destination means.

15. Method according to claim 14 wherein air is blown while elevating said center of said belt at a location near the appropriate destination means.

\* \* \* \* \*